United States Patent
Martin

[11] 3,884,389
[45] May 20, 1975

[54] WATER SUPPLY FOR VENDING MACHINES

[75] Inventor: Ernest Newell Martin, Escondido, Calif.

[73] Assignee: Arrowhead Puritas Water, Inc., Los Angeles, Calif.

[22] Filed: June 28, 1974

[21] Appl. No.: 484,241

[52] U.S. Cl. ......... 222/146 HE; 222/129.4; 222/425
[51] Int. Cl. ............................................. B67d 5/62
[58] Field of Search ......... 222/424.5, 425, 146 HE, 222/442, 129.3, 129.4, 129.1, 146 H, 146 HS

[56] References Cited
UNITED STATES PATENTS
| | | | |
|---|---|---|---|
| 2,583,461 | 1/1952 | Arnett | 222/129.3 X |
| 2,935,236 | 5/1960 | Mueller | 222/425 |

*Primary Examiner*—Robert B. Reeves
*Assistant Examiner*—Hadd S. Lane
*Attorney, Agent, or Firm*—Georges A. Maxwell

[57] ABSTRACT

A hot water supply for a hot beverage dispensing machine which includes a water tank with a partition defining upper and lower chambers, a flow-beaning aperture between the upper and lower chambers and a vent from the top of the lower chamber to atmosphere above the water level in the upper chamber whereby water flows from the upper chamber into the lower chambei at a controlled rate to fill the lower chamber, and water dispensing means comprising a stand-pipe with an upper open end communicating with the upper end of the lower chamber to be filled with water therefrom when the lower chamber is full and a normally closed valve at its lower end and to be opened to dispense the water therein, the volumetric extent of the stand pipe being substantially equal to the measured volume of water. The rate of flow through and from the dispensing means being greater than the rate of flow through the aperture whereby the water level in the lower chamber drops to the upper end of the stand-pipe and the stand pipe empties, when the valve is open, at a rate sufficiently greater than the lower chamber and stand-pipe can be filled whereby a substantially uniform volume of water is dispensed, each time the valve is opened. Said means further includes heater means and thermostatic control means therefor related to the lower end of the tank to heat the water in the lower chamber, the volume of heated water in the lower chamber being sufficiently great to store adequate heat to heat water flowing into the lower chamber to a satisfactory and usable temperature.

10 Claims, 6 Drawing Figures

PATENTED MAY 20 1975

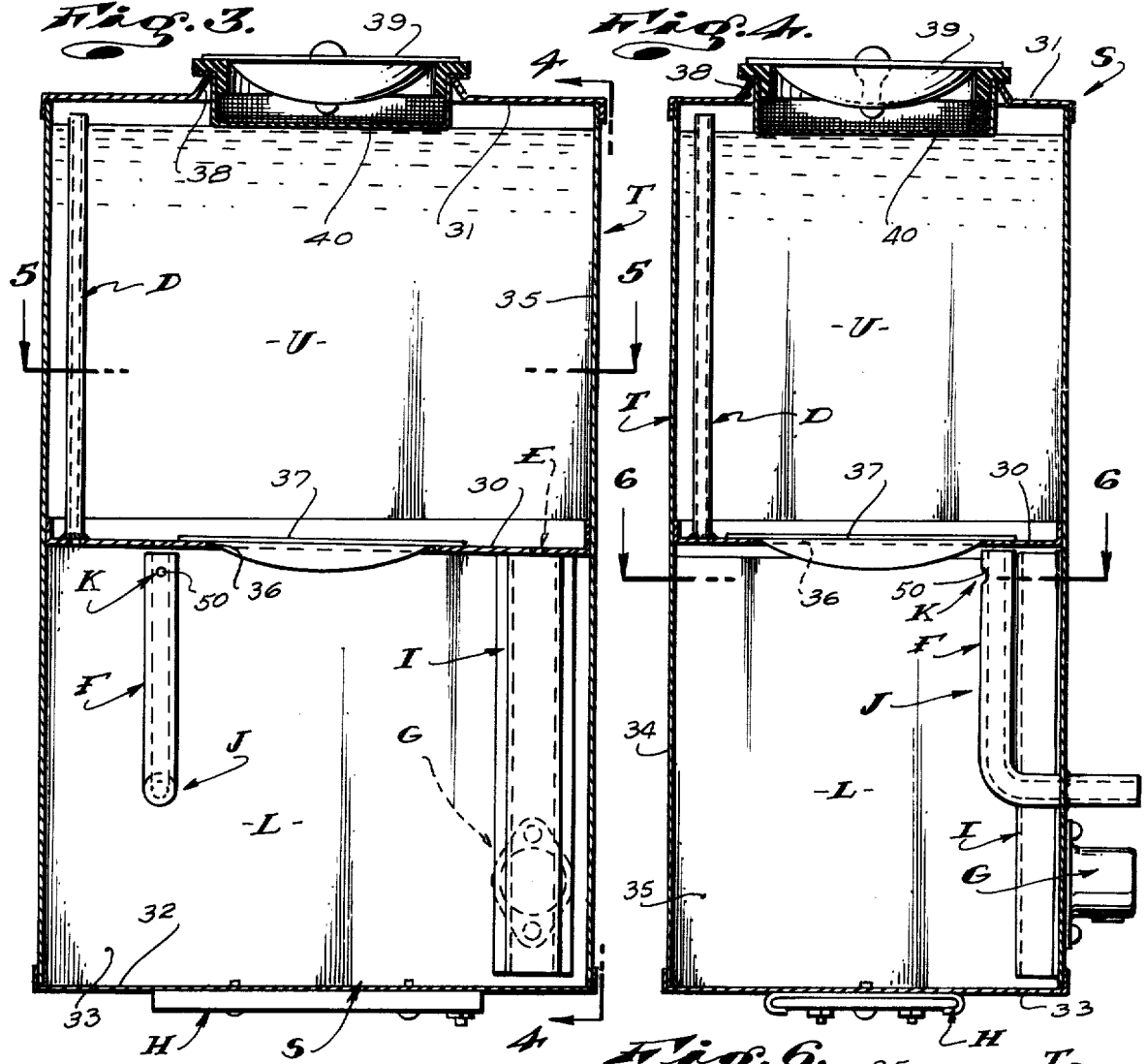

WATER SUPPLY FOR VENDING MACHINES

This invention has to do with a beverage vending machine and is more particularly concerned with a machine for mixing and vending hot beverages having improved, novel, water supply means.

In past years the prior art has developed numerous machines for vending hot beverages which machines are provided with a hot water supply, a supply of beverage concentrate, such as dehydrated coffee, tea, chocolate and soup concentrates, dispensing means for the water and the concentrate and adapted to dispense metered quantities of water and concentrate into a cup or the like; and coin-actuated control means operatively related to the dispensing means to cycle those means to dispense the materials and establish a cup of beverage, each time an appropriate coin is introduced into the machine.

In some hot beverage vending machines of the general character referred to above, the water supply is directly related to a community or municipal water service which is at substantially constant pressure. In such cases, the dispensing of predetermined metered volumes of water is easily controlled by simple timed opening of a related water dispensing valve.

There are many cases where circumstances and conditions are such that connection of such machines with a constant pressure water service is impractical or impossible. As a result of the above, the prior art have provided hot beverage vending machines of the character referred to which include self-contained hot water supplies. The typical water supply in such machines includes a simple reservoir or water tank with a thermostatically controlled resistance heater to heat and maintain the water at a desired temperature. These water tanks have tape lines communicating with the lower interiors thereof and with which water dispensing valves are related. They are provided with filler openings at their upper ends through which fresh supplies of water can be powered, as required.

The above noted provision of simple water tanks for self-contained water supplies in vending machines has proven to be wanting and not wholly satisfactory since as the water is dispensed therefrom and its level drops, its hydrostatic head pressure is lowered. As a result of this noted change in pressure, less water is dispensed each time a metered volume is dispensed. Accordingly, the first dispensed volume of water, subsequent to filling the tank, as a general rule, is greater than the last to be dispensed volume of water. As a result, the first cup of brew is full and of weak strength and the last cup of brew is short or less than full and is excessively strong.

In efforts to overcome the above shortcomings or disadvantages found in simple tank type hot water supplies, the prior art has sought to pressurize the tank by suitable forms of air pumps to maintain a constant head thereon and has sought to circumvent the problems created by the head pressures in such tanks by dispensing metered volumes of hot water, in the tanks, by means of motor-driven metering pump means. While these and other similar efforts have proven to be effective, they have, at the same time, proven to be impractical as the cost of such supplemental means is excessive (from a practical standpoint, in an economically competitive art), they are subject to failure or malfunctioning and their inclusion compounds the likelihood of breakdown of the machines and the time and effort expended for maintenance service.

Another shortcoming found to exist in vending machines of the character here referred to and which include hot water supply tanks, with electric resistance heaters, resides in the fact that the tanks are of limited volumetric capacity and must be regularly refilled. Refilling of the tanks must oftentimes be effected during periods of heavy use and operation of the machines. Upon refilling the ordinary supply tank, cold water is powered in, which water mixes with the small, remaining, volume of hot water in the tank and results in immediately cooling the supply of water to an extent that a satisfactory brew cannot be made. When the above occurs, and before a hot brew can be dispensed, a sufficient period of time must be permitted to elapse, to permit the heater related to the tank to heat the entire supply of water to the required temperature.

In efforts to overcome the above noted problem in the ordinary vending machine, a secondary, ready supply of hot water is sometimes provided. Such a secondary supply often consists of an inplant hot water system from which partially heated water can be tapped to fill the tanks. In other circumstances, a secondary, electric coffee urn is employed as a source of a ready supply of hot water.

Another and more commonly provided means to overcome the above noted problem is the provision of a primary, high output, electric resistance heater element in a tank which operates to rapidly bring the temperature of a fresh supply of cold water up to desired temperature and which thereafter is turned off, whereupon a secondary, low output electric heater element operates to maintain the water supply hot. This sort of means is costly to establish and operate as it requires the provision and operation of high voltage heater means and is only a partial solution to the problem as it only serves to speed up heating of the water and/or reduce the down time which would otherwise be experienced.

Another means for heating the water in such machines has involved the provision of a high voltage, high output resistance heater element in the delivery duct extending from the supply tank and which serves to heat each metered volume of water as it is being dispensed. Such means presents many special problems and are not considered safe or practical since they require a high voltage power source and are relatively inefficient.

An object and feature of the instant invention is to provide a novel and improved hot water supply for vending machines of the general character referred to which is such that substantially the same volume of water is dispensed each time the machine is cycled or operated, regardless of the volume of dispensable water in the supply tank.

Another object and feature of my invention is to provide a water supply for a machine of the general character referred to which is such that upon replenishing the supply of dispensable water with cold fresh water, a supply of ready to use, dispensable hot water is immediately available.

Yet another object and feature of this invention is to provide a water supply means of the character referred to which is such that a supply of ready to use hot water is maintained by means of a relatively low output resistance heater element which requires a relatively low, common 110 volt power supply and which results in the use of a minimal amount of electric power in and throughout normal operation of the machine.

It is an object and feature of my invention to provide a water supply of the general character referred to above including a tank with a lower chamber to receive and hold a primary supply of hot ready to dispense water, an upper chamber to receive and hold a secondary supply of water and means between and communicating with the chambers to conduct water from the upper chamber to the lower chamber, whereby the lower chamber is maintained substantially full and at a substantially constant head pressure at a water discharge or dispensing means related to that supply.

Still further, it is an object and feature of the instant invention to provide a water supply of the general character referred to wherein cold water conducted from the secondary supply in the upper chamber into the primary supply of hot water in the lower chamber is caused to flow and is deposited at and across a flat bottom surface of the lower chamber with which a heater element is related, which heater is controlled by a thermostat responsive to the temperature of the inflowing cold water, whereby the cold water is not initially caused to mix with the hot water, but rather, is caused to first flow into direct contact with and across the heated bottom of the tank and is quickly heated thereby, before completely mixing with the existing supply of hot water.

It is an object and feature of my invention to provide a water supply of the character referred to wherein the dispensing means comprises an upwardly opening vertical stand-pipe in the lower chamber, with its upper open end in close proximity to the upper limits of that chamber with its lower end extending from within the tank to an electrically operated dispensing valve and the volumetric extent of which is substantially equal to the desired metered volume of water to be dispensed upon each cycling of the machine.

It is a further object and feature of my invention to provide a water supply of the character referred to wherein hot water in the lower chamber, below the open top of the stand pipe serves as a heat reservoir or heat sink which serves to heat cold water flowing from the upper chamber into said lower chamber up to acceptable and usable temperatures.

The foregoing and other objects and features of my invention will become apparent and will be fully understood from the following detailed description of a typical preferred form and application of my invention, throughout which description is made to the accompanying drawings, in which:

FIG. 3 is a cross-sectional view of the water supply means and taken substantially as indicated by line 3—3 on FIG. 2;

FIG. 4 is a view taken as indicated by line 4—4 on FIG. 3;

FIG. 5 is a view taken as indicated by line 5—5 on FIG. 3; and

FIG. 6 is a view taken as indicated by line 6—6 on FIG. 4.

Figures 1, 2:
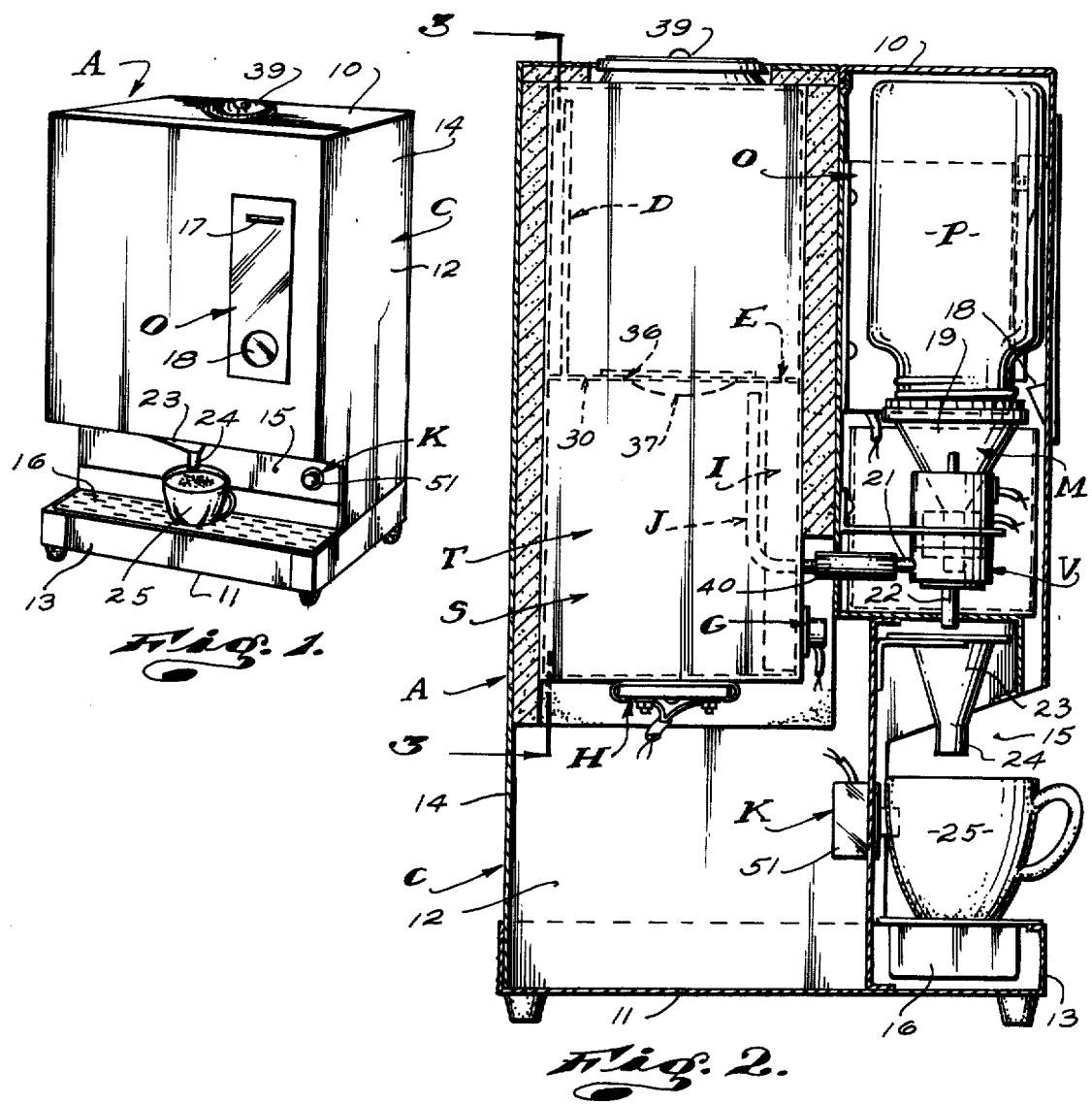
FIG. 1 is a perspective view of a vending machine.
FIG. 2 is a cross-sectional view of the machine illustrated in FIG. 1 and showing the water supply means that I provide related thereto.

In FIGS. 1 and 2 of the drawings, I have illustrated the basic, coin-operated, hot beverage dispensing machine A in and with which the water supply S of the instant invention is incorporated and forms a component part of.

The machine A is but one form and style of machine with which my present invention can be advantageously related and is shown and described for illustrative purposes only.

The machine A includes, basically, a sheet metal box-like cabinet C with top, bottom, side, front and rear walls 10, 11, 12, 13 and 14, respectively. The cabinet structure is sectional and such that one more of the sides or walls is in the nature of a removable panel whereby access to the interior of the cabinet can be made for easy and convenient assembly, maintenance and service of the components of the machine which are housed therein.

The lower portion of the front wall 13 is notched and/or recessed as at 15 to define a flat, horizontal, upwardly disposed shelf-like portion at the front of the cabinet and with which a suitable cup-supporting drip-pan 16 is related.

Within the cabinet C, in that portion which overlies the drop tray 16 and defines the top of the notch or recess 15, is arranged, a product or concentrate supply means P, product metering and dispensing means M, water dispensing valve V and a coin-actuated operating means O. Arranged in the rear portion of the cabinet C is the water supply means S.

The water valve V and dispensing means M are electrically operated means and are operatively related and/or connected with and controlled by the coin-actuated operating means O.

The means O can vary widely in form and construction without affecting the instant invention and is therefore shown in block form and as having a coin receiving slot 17 and a coin return opening 18 accessibly at the front 13 of the cabinet C.

The product supply means P can vary in form and structure and is here shown as a simple, inverted jar in which a supply of beverage concentrate, such as granular, dehydrated coffee, is deposited and held.

The product metering and dispensing means M can also vary in form and in details of construction without departing from the spirit of or affecting the novelty of the instant invention and in the case illustrated is shown as including a downwardly convergent downwardly opening cone-like cap or funnel 19 engaged on the open neck of the inverted jar. The funnel 19 is provided with a vertically shiftable diaphragm in the nature of a valving member (not shown), which diaphragm is intermittently elevated out of seated engagement in the funnel by means of an electro magnetic coil mechanism about the neck of the funnel whereby a predetermined volume of concentrate is passed thereby and dispensed from the lower open end of the funnel, each time the means M is cycled.

The water valve V is a simple electrically operated valve having an inlet fitting 21 at one side and a downwardly opening discharge nozzle 22 at its bottom.

The valve V is an element of a water dispensing means J in the supply means S and is arranged adjacent one side of the dispensing means M.

The dispensing means M and valve V are arranged above and discharge into a mixing trough 23, which trough has a downwardly extending and opening discharge spout 24 extending through an opening in the top of the cabinet recess or notch 15, in spaced relationship above the drip pan 16 and such that water and concentrate deposited and mixed in the trough flows down and out through the spout 24 and into a cup 25 supported on said pan.

The operating means O is operable to effect opening of the valve V for a predetermined time interval, each time the machine is operated and so that a predetermined volume of water is dispensed.

The water supply means S that I provide, the details of which are shown separately in FIGS. 3 to 6 of the drawings, includes, basically, an elongate vertical tank T with a central partition 30 defining upper and lower chambers U and L.

The tank T can be of any desired configuration, but is preferably a cubical tank with flat, top, bottom, front, rear, and side walls 31, 32, 33, 34 and 35, respectively.

The partition 30 is a flat, substantially horizontal plate-like member within the tank at the central portion thereof and is provided with a central access or service opening 36, which opening is normally closed and sealed by a cap or plate-like closure 37.

Further, the partition 30 is, in the preferred carrying out of the invention, pitched or inclined (from horizontal) whereby the bottom of the upper chamber U has a low side to and from which water can be most effectively drained, and, whereby the lower chamber L has a high side from which air in the chamber L can be most effectively vented.

In practice, the desired draining and venting effected by inclination of the partition could be effected by suitably drawing and or forming the partition with channels and/or recesses without departing from the spirit of my invention.

The top wall 31 of the tank is provided with an access and filler opening 38 which communicates with an appropriate access opening in the top wall of the cabinet C. The opening 38 is normally closed, but not tightly sealed, by a lid 39. The lid 39 is preferably a concavo-convex sheet metal closure and is arranged in the opening 38 whereby condensate forming on its lower surface runs down and drops back into the chamber U. A suitable knob is provided on the closure to facilitate its handling and manipulation.

In practice, a removable screen 40 is provided with the upper chamber U about the opening 38 which screen in addition to preventing foreign matter from entering the tank serves as a water level indicator. As a water level indicator, the screen reduces the likelihood of introducing excess water into the tank. If too much cold water is introduced into the tank, it will, upon being heated and expanded, overflow the tank.

The means S next includes a vent D extending between and communicating with the top of the chamber L and upper portion of the chamber U. The vent D is a simple open ended pipe or tube with a lower end engaged and fixed in an opening in the partition 30 and an upper end opening at the upper portion of the chamber U.

In practice, the vent pipe or vent D is at the upper or high side of the partition 30 and communicates with the uppermost limits or high-side of the chamber L whereby substantially all air can be freely exhausted from the chamber L and the chamber L can be substantially fully occuped or filled with water.

The means S next includes a water transfer port or orifice E in the partition 30 communicating between chambers U and L and through which water flows from the chamber U into the chamber L. The transfer port E is a flow-bean, that is, it is of predetermined limited size so as to restrict the rate of flow of water from chamber U to chamber L. The rate of flow established by and through the port E is such that the volume of water transferred therethrough, throughout each cyclical period of the machine, is substantially equal to the measured volume of water dispensed each time the machine A is operated.

In connection with the foregoing, it is to be noted and understood that the time period during which the water valve V is opening is but a fraction of the cyclical period of the machine and that the measured volume of water is dispensed rather rapidly into the mixing trough of the machine, from which the brew drains, at a controlled rate, into a receiving cup. In practice, for example, the valve V is opened and a cup of water is dispensed into the mixing trough in a time period which is about one-quarter the cyclical period of operation of the machine.

The means S next includes the dispensing means J, of which the valve V is an element or part. The means J includes a vertical stand-pipe F within chamber L, the volumetric capacity of which is substantially equal to one cup of water. The stand-pipe F has an upper open inlet end in close, predetermined, spaced relationship from the bottom surface of the partition 30 at or near the high side thereof and has a lower outlet end which is, in the case illustrated, turned laterally outward to extend through a side of the tank and is connected with the valve V. The pipe F is connected with the fitting 20 of valve V by a coupler tube 40.

The space between the partition and the top of pipe F is such that upon opening of the valve V and the draining of water from the pipe, the water level in the chamber L rapidly drops below the open end of the pipe. Accordingly, when the valve V is opened, the water in the pipe F starts to flow and the water level in the chamber drops below the open end of the pipe F. Thereafter, the water in the pipe drains into the mixing trough. As a result, the volume of water dispensed is substantially invariable upon each cycling of the machine.

It will be noted and apparent from the foregoing that the water supply means S here provided in effect operated to intermittently fill the stand pipe F of the water dispensing means J and that upon cycling of the machine, the stand pipe F, with its measured volume or cup of water, is drained to dispense the measured volume of water, as required.

Due to the flow-bean, or flow restrictive, effect of the transfer port E, water in the upper chamber U cannot flow into the chamber L at a rate and in such volume as to keep the chamber L filled and the pipe F flooded when the valve V is opened.

It is to be noted that the pipe F is preferably a metal pipe having high heat conductivity and extends freely through the water in the chamber L, which water is heated, as will hereinafter be described. As a result of this relationship of parts, the water in the pipe F is maintained at the same temperature as is the water in the chamber L.

It is to be further noted that the volumetric capacity of the pipe F is a predetermined volume less than the desired measured volume of water that is to be dispensed and so that the small additional or extra water which occurs in the valve V, the coupling 20 and which normally occurs in the chamber L above the top or inlet end of the pipe F is compensated or accounted for.

The means S next includes heater means H to heat the water in the chamber L and control means G therefor.

The heater means H can be and is shown as a simple strip-type electric resistance heater element suitably fixed to the bottom 32 of the tank T. The heater H is such that when it is energized, it serves to heat the bottom 32 and the water in the lower chamber L adjacent to said bottom.

The means G includes a thermostat and switch unit fixed to a side wall of the tnk, at the exterior thereof and responsive to the temperature of the portion of the side wall with which it is related and as determined by the temperature of the water in contact with that portion of the tank. The unit or means G is suitably connected with and controls the supply of electric power to the heater H.

The means S next includes a vertical cold water flow duct I in the chamber L, one wall or side of which is defined by the side of the tank which includes that portion of the tank side with which the thermostat unit G is related.

The other sides of the duct I are established by a channel member or part fixed to the related side wall of the tank, substantially as shown.

The upper end of the duct communicated directly with the transfer port E in the partition 30 and its lower end opens in close, predetermined, spaced relationship above the bottom 32 of the tank T.

The volumetric extent of the duct is preferably two or three cups or several times greater than the volume of water dispensed each time the machine is cycled, so that the rate at which the cool water flows outwardly and laterally from the lower end thereof, across the bottom 32 of the tank is relatively slow or gentle and such that it tends not to create turbulence with the hot water in the chamber L. As a result of the foregoing, and since the inflowing cold water is heavier than the heated water in the chamber L and tends to drop or stay at the bottom of the chamber, it will be apparent that the cold water is caused to flow and flood across the heated bottom 32 of the tank and is most efficiently and effectively heated thereby before being mixed and blended with the other hot water in the chamber L.

It will be further noted that with the thermostat-switch G related to the portion of the side wall of the tank defining the duct I, the heater is energized in response to the temperature of the inflowing cool water. With such a relationship of parts, the thermostat unit is subjected to immediate and pronounced changes or variations in temperature and little or no lag or time delay in energizing the heater H results.

In operation, the heater H is energized to the extent necessary to heat the cool water in the duct, which water is remote from the heater and so that as hot water is removed from the chamber L and is replaced by water flowing through the duct, there is sufficient extra or additional heat in the water in the chamber to immediately bring the inflowing cool water up to temperature.

In other words, it can be said that the heater H heats the water in the chamber L so that the inflowing cool water is brought up to desired temperature upon entering the chamber L.

In practice, and while the machine is idle, the partition 30 and the walls of the duct I within the chamber L serve as a heat transfer means and slowly takes the chill from and/or heat the water in the upper chamber U and in the duct. As a result of the above, if left idle, the water in the duct I and upper chamber U is brought to or near the desired usable temprature and the heater H is not necessarily energized each time the machine is cycled.

Finally, the means S is provided with extra water dispensing means K which means is adapted to enable a customer or operator of the machine to obtain a full measured volume of water after the supply of water in the upper chamber is exhausted and the level of the water in the chamber L has dropped below the upper inlet end of the stand pipe F.

Such a means is desirable and deemed necessary so that the machine will not tend to short or cheat the last customer or customers.

The means K includes a bleed port 50 in the upper portion of the stand pipe F below the upper end thereof and below the level of the hot water remaining in the chamber L. The port 50 is insufficient in size and flow capacity to adversely affect the normal operation of the means S and is of sufficient size and capacity to permit a small volume or trickle of water to enter the pipe F.

Means K next includes a manually operable "extra water" switch 51 accessible at the exterior of the cabinet C and controlling the valve V so that a customer who has not received a full cup of water or brew can, by operating the switch 51, cause the valve V to open and receive at a reduced rate a desired or necessary added measure of water.

In practice, the tank T is covered and/or surrounded with suitable heat insulating material, to retain as much heat as is practical and to increase the efficiency of the machine.

In practice, when the chamber U is exhausted or drained of water and it is determined that a new or fresh supply of water is required, a sufficient volume of hot water is reserved in the lower chamber so that upon adding or introducing fresh cool water into the upper chamber and upon subsequent controlled flow of the added cool water into the lower chamber, there is sufficient stored heat in the reserved hot water to maintain a required supply of adequately heated water.

In practice, when the lower chamber L holds 40 cups of reserved heated water, it has been determined that 15 cups of cold water can be added thereto, without additional heating of the water by the heater H, and still dispense water at an acceptably high temperature. In the same situation, but with the heater in full operation, it has been determined that as many as 40 cups of cold water can be introduced into the lower chamber by continuous re-cycling of the machine without any appreciable drop in temperature of the dispensed water.

It will be apparent from the foregoing that with the self-contained water supply means S that I provide, a uniform measure of hot water can be provided each time the machine, with which the water supply is related, is cycled, regardless of the volume of water in the supply and the differing head pressure that might be acting upon it. It will be further apparent that with the hot water supply means here provided, the supply of hot water can be replenished by the introduction of substantial volumes of cold water without adversely affecting the capacity of the means to dispense hot water.

Having described but one typical preferred form and carrying out of my invention, I do not wish to be limited to the specific details herein set forth but wish to reserve to myself any modifications or variations which may appear to those skilled in the art and which fall within the scope of the following claims:

Having described my invention, I claim:

1. A water supply means for a beverage dispensing machine comprising an elongate vertical tank, a partition within the tank defining upper and lower chambers, a water inlet opening in the top of the tank, a flow beaning aperture in the partition communicating with the chambers, a vent pipe communicating with the top of the lower chamber and with atmosphere above the high water level in the upper chamber, water dispensing means to intermittently dispense a predetermined volume of water comprising an elongate vertical open ended stand pipe, the volumetric extent of which is substantially equal to the volume of water to be dispensed and arranged with its upper end in close proximity to the bottom surface of the partition and communicating with the lower chamber and a normally closed valve with inlet means connected with the lower end of the stand pipe and outlet means to dispense water in the stand pipe, the rate of flow through the aperture being less than the rate of flow through the valve when the valve is open.

2. A water supply means as set forth in claim 1 which further includes heater means to heat the water in the lower chamber and which includes an electric resistance heater at the bottom of the tank and connected with a power supply and a heat responsive power control means between the heater and the power control means, said control means being fixed to and carried by a portion of the tank defining the lower chamber and responsive to the temperature of the water in said lower chamber.

3. A water supply means as set forth in claim 2 wherein the bottom of the tank is substantially flat and said power control means is fixed to one vertical side wall of the tank in spaced relationship above the bottom thereof, said heater means further includes water flow control means to direct and control the flow of water from the upper chamber into the lower chamber and relative to the power control means and the heater, said flow control means comprising an elongate vertical member in the lower chamber and related to said one vertical side wall of the tank and cooperating therewith to define a vertical flow duct with open upper and lower ends, the upper end of the duct communicates with the aperture in the partition and the lower end of the duct opens in the lower chamber in closed vertical spaced relationship above said bottom, the volumetric extent of the duct is greater than the volumetric extent of the stand pipe whereby water from the upper chamber flowing through the duct and into the lower chamber when a volume of water has been dispensed is directed across said bottom above the heater, and whereby the power control means is responsive to the temperature of the water in the lower chamber within the duct.

4. A water supply means as set forth in claim 3 wherein the partition is formed whereby the upper chamber has a low side to which water drains and the upper chamber has a high side to which air vents, said aperture is positioned at said low side of the upper chamber and said vent pipe communicates with the high side of the lower chamber.

5. A water supply means as set forth in claim 1, which further includes an electric resistance heater means at the bottom of the tank to heat the water in the lower chamber, the volume of water in the lower chamber being equal to at least 10 times the volume of water in the water dispensing means and establishes a heat store to heat water flowing from the upper chamber into the lower chamber.

6. A water supply means as set forth in claim 1, which further includes an electric resistance heater means at the bottom of the tank to heat the water in the lower chamber, the volume of water in the lower chamber being equal to at least 10 times the volume of water in the water dispensing means and establishes a heat store to heat water flowing from the upper chamber into the lower chamber, a power supply for the heater and temperature responsive control means between the heater and the power supply and responsive to the temperature of the water in the lower chamber.

7. A water supply means as set forth in claim 1, which further includes an electric resistance heater means at the bottom of the tank to heat the water in the lower chamber, the volume of water in the lower chamber being equal to at least 10 times the volume of water in the water dispensing means and establishes a heat store to heat water flowing from the upper chamber into the lower chamber, a power supply for the heater and temperature responsive control means between the heater and the power supply and responsive to the temperature of the water in the lower chamber, said bottom of the tank is substantially flat and said power control means is fixed to one vertical side wall of the tank in spaced relationship above the bottom thereof, said heater means further includes water flow control means to direct and control the flow of water from the upper chamber into the lower chamber and relative to the power control means and the heater, said flow control means comprising an elongate vertical member in the lower chamber and related to said one vertical side wall of the tank and cooperating therewith to define a vertical flow duct with open upper and lower ends, the upper end of the duct communicates with the aperture in the partition and the lower end of the duct opens in the lower chamber in closed vertical spaced relationship above said bottom, the volumetric extent of the duct is greater than the volumetric extent of the stand pipe whereby water from the upper chamber flowing through the duct and into the lower chamber when a volume of water has been dispensed, is directed across said bottom above the heater, and whereby the power control means is responsive to the temperature of the water in the lower chamber and within the duct.

8. A water supply means as set forth in claim 7 wherein the partition is formed whereby the upper chamber has a low side to which water drains and the upper chamber has a high side to which air vents, said aperture is positioned at said low side of the upper chamber and said vent pipe communicates with the high side of the lower chamber.

9. A water supply means as set forth in claim 8 wherein the partition is a heat conductor whereby heat from the water in the lower chamber is conducted into the water in the upper chamber.

10. A water supply means as set forth in claim 8 wherein the partition is a heat conductor whereby heat from the water in the lower chamber is conducted into the water in the upper chamber, said stand pipe being a heat conductor and has an upper major portion of its longitudinal extent within the lower chamber whereby the water in the stand pipe is maintained hot by the water in the lower chamber about the stand pipe.

* * * * *